(12) United States Patent
Murakami

(10) Patent No.: US 6,972,547 B2
(45) Date of Patent: Dec. 6, 2005

(54) POWER SUPPLY FOR POSITIVE AND NEGATIVE OUTPUT VOLTAGES

(75) Inventor: Sadakazu Murakami, Kyoto (JP)

(73) Assignee: Rohm, Co., Ltd., Kyoto (JP)

( * ) Notice: Subject to any disclaimer, the term of this patent is extended or adjusted under 35 U.S.C. 154(b) by 0 days.

(21) Appl. No.: 10/850,704

(22) Filed: May 21, 2004

(65) Prior Publication Data

US 2005/0029996 A1    Feb. 10, 2005

(30) Foreign Application Priority Data

May 21, 2003    (JP)    .................... P. 2003-143875

(51) Int. Cl.[7] .................................................. G05F 1/577
(52) U.S. Cl. ..................................... 323/267; 323/222
(58) Field of Search ............................... 323/222, 266, 323/267, 271, 282, 284

(56) References Cited

U.S. PATENT DOCUMENTS

| | | | | |
|---|---|---|---|---|
| 4,459,538 A | * | 7/1984 | Arai et al. | ................... 323/275 |
| 5,896,284 A | * | 4/1999 | Murasato et al. | ........... 363/124 |
| 5,977,753 A | * | 11/1999 | Edwards et al. | ............. 323/222 |
| 6,060,869 A | * | 5/2000 | Shimoda | ...................... 323/271 |
| 6,222,351 B1 | * | 4/2001 | Fontanella et al. | ......... 323/267 |

FOREIGN PATENT DOCUMENTS

JP    2000-91503    3/2000

* cited by examiner

Primary Examiner—Gary L Laxton
(74) Attorney, Agent, or Firm—Hamre, Schumann, Mueller & Larson, P.C.

(57) ABSTRACT

A predetermined positive output voltage to be obtained by raising an input power supply voltage is outputted by switching a switch connected in series with a coil in a switching power supply circuit. On the other hand, in a negative output voltage generating circuit, a negative output voltage, which is equal in magnitude to a predetermined voltage, is generated according to a setting voltage, which is lower than the positive output voltage by the predetermined voltage, and a voltage that changes with switching.

20 Claims, 4 Drawing Sheets

US 6,972,547 B2

POWER SUPPLY FOR POSITIVE AND NEGATIVE OUTPUT VOLTAGES

BACKGROUND OF THE INVENTION

1. Field of the Invention

The present invention related to a power supply for positive and negative output voltages, which is enabled to generate a predetermined negative output voltage together with a positive output voltage converted from a power supply voltage by using a switching power circuit that employs a coil.

2. Description of the Related Art

In a related-art, a switching power supply employing a coil as a DC—DC converter for generating a voltage differing from a power supply voltage has been used. In a case where the switching power supply is of, for example, the step-up type, a high voltage is obtained from a DC input voltage by turning on and off electric current, which is fed to a coil, through the use of a switch. Then, the high voltage is rectified and smoothed. Thus, a raised output voltage is obtained (see M. Suzuki, "Teihon Zoku Toransistor Kairo No Sekkei1", CO Publishing Co., Ltd., Jul. 1, 1997, p. 250–p. 253).

To generate a voltage (a negative output voltage) of a polarity differing from a power supply voltage, a negative output voltage is generated from a power supply voltage by using a negative output voltage charge pump circuit. In a case where the voltage is changed to a constant voltage, it is necessary to obtain a predetermined negative output voltage from the generated negative output voltage by using a series regulator or the like (sea JP-A-2000-91503).

In recent years, the number or electronic devices (for instance, CCD cameras), which individually require a predetermined positive output voltage power supply and another predetermined negative output voltage power supply, has been increased. However, a related switching power supply circuit, which employs a coil and is generally used as a DC—DC converter, can get only a positive output voltage. When not only a positive output voltage but a predetermined negative output voltage is needed, a negative output voltage obtained by the combination of the related negative output voltage charge pump circuit and the series regulator has been additionally provided.

In the case that a positive output voltage power supply circuit and a negative output voltage power supply circuit are separately provided, the number of components increases, and a required space increases. Also, the related art has a problem that the cost increases.

SUMMARY OR THE INVENTION

Accordingly, an object of the invention is to provide a power supply for positive and negative output voltages, which is enabled to generate a predetermined positive output voltage, which is converted from a power supply voltage, by using a switching power supply circuit employing a coil, and also enabled to generate a predetermined negative output voltage by utilizing the switching power supply circuit.

According to an aspect of the invention, there is provided a power supply (hereunder referred to as a first power supply of the invention) for positive and negative output voltages, which comprises a switching power supply circuit having a coil L1, a switch Q1, series-connected with the coil, for switching energization of the coil by a voltage supplied from an input power supply $V_{cc}$ to the coil, a rectifying and smoothing circuit D1, C1 for rectifying and smoothing a voltage at a series connection point A between the coil and the switch and for outputting a resultant voltage as a positive output voltage $V_{o1}$, a positive output voltage detecting circuit 11 for generating a positive output voltage detection voltage $V_{det}$ from the positive output voltage, and a control circuit Cont for performing on-off switching of the switch so that the positive output voltage detection voltage is equal to a reference voltage $V_{def}$, and also comprises a negative output voltage setting circuit 20 for generating a negative output voltage setting voltage ($V_{o1}-V_z$), which is lower than the positive output voltage by a predetermined voltage $V_z$, and a negative output voltage generating circuit 30 for generating a negative output voltage $V_z$, whose magnitude corresponds to that of the predetermined voltage, according to the voltage $V_{o1}/0$ at the series connection point between the coil and the switch and to the negative output voltage setting voltage.

According to an embodiment (hereunder referred to as a second power supply of the invention) of the first power supply of the invention, the negative output voltage generating circuit 30 has a first capacitor C2 having an end connected to the series connection point between the coil L1 and the switch Q1. A series circuit constituted by series-connecting the first capacitor C2, a first diode D2, and a second capacitor C3 in the order of description in such a way as to connect the end of the first capacitor to the series connection paint, to connect the other and of the first capacitor to a cathode of the first diode, to connect an anode of the first diode to an end of the second capacitor and to connect the other end of the second capacitor to a reference potential is connected to the series connection point in parallel with the switch. An anode of the second diode D3 is connected to a connection point between the first diode and the first capacitor. A cathode of the second diode D3 is connected to an output point from which the negative output voltage setting voltage is outputted. A charging voltage of the second capacitor is outputted as the negative output voltage.

According to another aspect of the invention, there is provided a power supply (hereunder referred to as a third power supply of the invention) for positive and negative output voltages, which comprises a switching power supply circuit 10A having a coil L1A, a smoothing capacitor C1A, connected to an output end of the coil, for smoothing a voltage at the output end and for outputting a smoothed voltage as a positive output voltage $V_{o1}$, a first switch Q1A, connected to an input end of the coil, for switching energization of the coil by a voltage $V_{cc}$ supplied from an input power supply to the coil, a second switch Q2A, connected to a connection point between the coil and the first switch in parallel with a series circuit of the coil and the smoothing capacitor and adapted to be switched complimentarily to the first switch, positive output voltage detecting circuit 11A for generating a positive output voltage detection voltage $V_{det}$ according to the positive-output voltage, and a control circuit ContA for performing on-off switching of the first switch and the second switch so that the positive output voltage detection voltage is equal to a reference voltage $V_{ref}$, a negative output voltage setting circuit 20A for generating a negative output voltage setting voltage ($V_{o1}-V_z$), which is lower than an input voltage of the input power supply by a predetermined voltage $V_z$, and a negative output voltage generating circuit 30A for generating a negative output voltage $V_z$, whose magnitude corresponds to that of the predetermined voltage, according to an input power supply voltage $V_{cc}/0$ at the connection point A between the coil and the first switch and to the negative output voltage setting voltage.

According to an embodiment (hereunder referred to as a fourth power supply of the invention) of the third power supply of the invention, the negative output voltage generating circuit has a first capacitor C2 having an end connected to a connection point between the coil L1A and the switch Q1A. A series circuit constituted by series-connecting the first capacitor CZ, a first diode D2, and a second capacitor C3 in the order of description in such a way as to connect the end of the first capacitor to the connection point, to connect the other end of the first capacitor to a cathode of the first diode and to connect an anode of the first diode to one end of the second capacitor is connected to the connection point in parallel with the second switch Q2A. An anode of the second diode D3 is connected to a connection point between the first diode and the first capacitor. A cathode of the second diode is connected to an output point from which the negative output voltage setting voltage is outputted. A charging voltage of the second capacitor is outputted as the negative output voltage.

According to an embodiment (hereunder referred to as a fifth power supply or the invention) of one of the first to fourth power supplies of the invention, the positive output voltage detecting circuit comprises a series circuit including at least one light emitting diode and a constant current circuit. The positive output voltage detecting voltage is outputted from a series connection point of thereof.

According to an embodiment (hereunder referred to as a sixth power supply of the invention) of one of the first to fourth power supplies of the invention, the positive output voltage detecting circuit comprises a series circuit including at least one light emitting diode and a resistor. The positive output voltage detecting voltage is outputted from a series connection point of thereof.

According to an embodiment (hereunder referred to as a seventh power supply of the invention) of one of the first to fourth power supplies of the invention, the positive output voltage detecting circuit comprises a resistance potential dividing circuit. The positive output voltage detecting voltage is outputted from a potential dividing point of the resistance potential dividing circuit.

According to an embodiment (hereunder referred to as an eighth power supply of the invention) of one of the first to seventh power supplies of the invention, the negative output voltage setting circuit comprises a series circuit including at least one zener diode serving as a voltage dropping device and also including a constant current circuit. The negative output voltage setting voltage is outputted from a aeries connection point thereof.

According to an embodiment (hereunder referred to as a ninth power supply of the invention) of one of the first to seventh power supplies or the invention, the negative output voltage setting circuit comprises a series circuit including at least one diode serving as a voltage dropping device and also including a constant current circuit. The negative output voltage setting voltage is outputted from a series connection point thereof.

According to an embodiment (hereunder referred to as a tenth power supply of the invention) of the eighth or ninth power supply of the invention, the negative output voltage setting voltage can be changed by changing the number of series-connected voltage dropping devices of the negative output voltage setting circuit.

According to an embodiment (hereunder referred to as an eleventh power supply of the invention) or one of the first to seventh power supplies of the invention, the negative output voltage setting circuit comprises a series circuit including a resistor serving as a voltage dropping device and also including a constant current circuit. The negative output voltage setting voltage is outputted from a series connection point thereof.

DETAILED DESCRIPTION OF THE INVENTION

Figure 1:
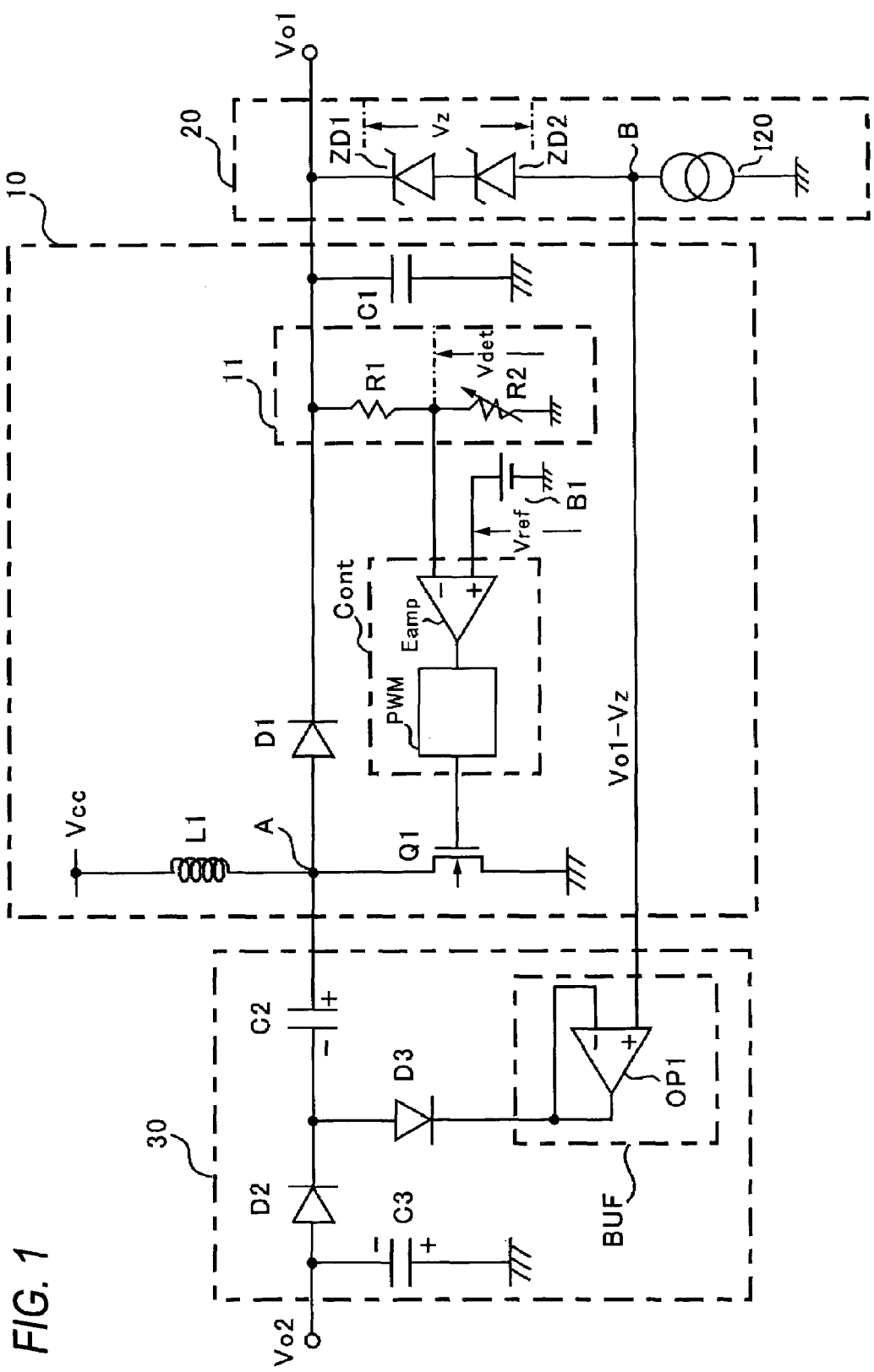
FIG. 1 is a view illustrating the configuration of a power supply for positive and negative output voltages according to a first embodiment of the invention.

Hereinafter, embodiments of a power supply for positive and negative output voltages according to the invention are described by referring to the accompanying drawings; FIG. 1 is a view illustrating the configuration of a power supply for positive and negative output voltages according to a first embodiment of the invention.

As shown in FIG. 1, a switching power supply circuit 10 is a step-up power supply circuit adapted to raise an input power supply voltage $V_{cc}$ and to output the raised positive output voltage $V_{O1}$.

A switch Q1, which is an N-type MOS transistor, is series-connected between the power supply voltage $V_{cc}$ and the ground. A voltage at a series connection point A is rectified and smoothed by a rectifying diode D1 and a smoothing capacitor C1 and then outputted as an output voltage $V_{O1}$ therefrom. Incidentally, unless otherwise described, the "voltage" means electric potential with respect to the ground.

A positive output voltage detecting circuit 11 generates a detection voltage $V_{det}$ associated with the positive output voltage $V_{O1}$. In this embodiment, the positive output voltage $V_{O1}$ is divided by a resistance potential dividing circuit consisting of a resistance R1 and a resistance R2 to thereby obtain the detection voltage $V_{det}$. The detection voltage $V_{det}$ is adjusted by changing the value of the resistance R1 or the resistance R2.

The detection voltage $V_{det}$ and a reference voltage $V_{ref}$ from a reference voltage supply B1 are inputted to a control circuit $C_{ont}$, which generates a switching signal for switching-controlling the switch Q1 so that the detection voltage $V_{det}$ is equal to the reference voltage $V_{ref}$. In this embodiment, the control circuit $C_{ont}$ is configured in such a way as to include an error amplifier $E_{amp}$ for a amplifying and outputting the difference between the reference voltage $V_{ref}$ and the detection voltage $V_{det}$, and also include a PWM control circuit for forming a PWM signal according to an output of this error amplifier $E_{amp}$ and for outputting the PWM signal as a switching signal.

The positive output voltage $V_{O1}$ is controlled by this switching power supply circuit 10 in such a manner as to become equal to a predetermined voltage (=$V_{ref} \times (R1+R2)/R2$) obtained by raising the power supply voltage $V_{cc}$. The voltage at the connection point A becomes equal to 0 and the positive output voltage $V_{O1}$ in response to on and off of the switch Q1, respectively.

A negative output voltage setting circuit 20 is configured by series-connecting a predetermined number of zener diodes ZD1 and ZD2 and a constant current source 120 between a positive output voltage point ($V_{O1}$) and the ground. These zener diodes are used for obtaining a predetermined voltage drop $V_z$. Thus, an appropriate number of the zener diodes is selected according to the predetermined voltage $V_z$. A negative output voltage setting voltage ($V_{O1}-V_z$), which is lower than the positive output voltage $V_{O1}$ by the predetermined voltage $V_z$, is outputted from a connection point B between the zener diode and the constant current source 120.

In a negative output voltage generating circuit 30, a first capacitor C2, a first diode D2, and a second capacitor C3 are connected between the connection point A and the ground, that is, connected in parallel with the switch Q1. The polarity of the first diode D2 is set so that a first-capacitor-side electrode thereof is a cathode. An anode of the second diode D3 is connected to the connection point between the first diode D2 and the first capacitor C2. A cathode of the second diode D3 is connected to a point from which the negative output voltage setting voltage ($V_{O1}-V_z$) is outputted. This point, from which the negative output voltage setting voltage ($V_{O1}-V_z$) is outputted, is an output terminal of a buffer circuit BUF. This buffer circuit BUF is configured as a voltage follower by connecting the connection point B to a noninverting input terminal (+) of an operational amplifier and also connecting an inverting terminal (−) thereof to the output terminal thereof. Further, a charging voltage of the second capacitor C3 is outputted as a negative output voltage $V_{O2}$.

An operation of the power supply for positive and negative output voltages, which is configured in this way, is described hereinbelow. First, in the switching power supply circuit 10, the switch Q1 is switching-controlled so that the detection voltage $V_{det}$ is equal to the reference voltage $V_{ref}$. In a state in which the detection voltage $V_{det}$ is equal to the reference voltage $V_{ref}$, the positive output voltage $V_{O1}$ is controlled in such a way as to be a predetermined voltage.

At that time, the voltage at the output terminal of the buffer circuit BUF is equal to the negative output voltage setting voltage ($V_{O1}-V_z$). On the other hand, at the connection point A, voltages, that is, 0 and the positive output voltage $V_{O1}$ are repeatedly generated in response to turning-on and turning-off of the switch Q1.

In the negative output voltage generating circuit 30, when the voltage at the connection point A is equal to the positive output voltage $V_{O1}$, the first capacitor C2 is charged through a first route, which includes the first capacitor C2 and the second diode D3, in such a way as to have polarities as shown in this figure. The charging voltage of the first capacitor C2 is set to be equal to the difference $V_z$ (that is, the predetermined voltage $V_z$) between the voltage $V_{O1}$ at the connection point A and the negative output voltage setting voltage ($V_{O1}-V_z$).

Next, when the voltage at the connection point A is 0, that is, when the switch Q1 is on, a second route including a series circuit from the switch Q1 through the first capacitor C2, the first diode D2 to the second capacitor C3 is formed. Electric charge charged in the first capacitor C2 is distributed to the second capacitor C3 through the second route.

Electric charges are gradually stored in a negative one of electrodes of the second capacitor C3, which are arranged as shown in FIG. 1, through the charging of the first capacitor C2, which is performed by using the first route, and the distribution of electric charge to the first capacitor C2 and the second capacitor C3, which is performed by using the second route. An amount or charge stored in the first capacitor C2 gradually increases by repeating the charging and the charge distribution. In a stationary state, a predetermined negative voltage $V_z$ is developed across the first charge CZ.

The predetermined negative voltage $V_z$ charged across the second capacitor C3 is outputted as the negative output voltage $V_{O2}$. The negative output voltage is determined by a voltage drop caused by a predetermined number of zener diodes ZD1 and ZD2 of the negative output voltage setting circuit 20, regardless of the magnitude of the positive output voltage $V_{O1}$. Therefore, the magnitude of the negative output voltage $V_{O2}$ is constant. Additionally, the magnitude of the negative output voltage $V_{O2}$ can be changed by adjusting the number of the zener diodes.

Figure 2:
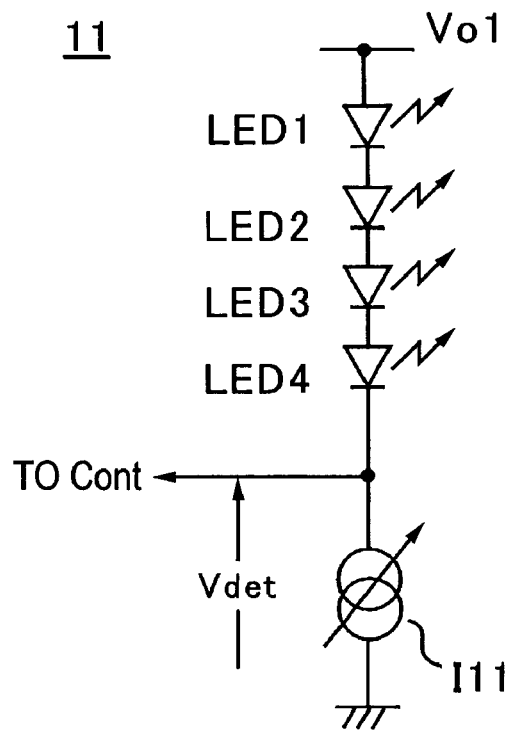
FIG. 2 is a view illustrating the configuration of another positive output voltage detecting circuit according to a second embodiment of the invention.

FIG. 2 shows a second embodiment of the invention, which is another positive output voltage detecting circuit 11 adapted to be used not only for setting the voltage but also for driving a display device.

As shown in FIG. 2, in the positive output voltage detecting circuit 11, a light emitting diode group consisting of plural light emitting diodes LED1–LED4, which are used as display devices, and a constant current source I11 for feeding predetermined electric current, which is needed for causing the light emitting diode group to emit light, are series-connected between positive output voltage point ($V_{O1}$) and the ground. A voltage at a series connection point, at which this light emitting diode group and the constant current source I11 are series-connected, is supplied to a control circuit Cont as a detection voltage $V_{det}$. An electric current value at the constant current source I11 is variable and can be set at an appropriate electric current value.

In the positive output voltage detecting circuit 11 shown in FIG. 2, a constant current set in the constant current source I11 flows through in the light emitting diode group. Thus, the light emitting diodes LED1 to LED4 turn on in such a way as to emit a predetermined amount of light.

Generally, there is usually slight variation in voltage drop at light emission among light emitting diodes. However, even when this variation occurs, the constant current needed for light emission flows therethrough. The amount of emitted light itself causes no problem.

The voltage drop in the constant current supply I11 is the detection voltage $V_{det}$ and thus maintained by a control action of the control circuit Cont at a constant value (that is, the reference voltage $V_{ref}$). Therefore, the voltage applied to the constant current source I11 is always ensured in such a manner as to have a constant value needed for a constant current operation thereof.

In this case, the positive output voltage $V_{O1}$ is a sum of the detection voltage $V_{det}$ and a voltage drop in the light emitting diode group and thus changes in response to the variation in the voltage drop in the light emitting diode group. However, the negative output voltage $V_{O2}$ is obtained as a difference voltage between the positive output voltage $V_{O1}$ at the connection point A and the voltage ($V_{O1}-V_z$) at the connection point B, and thus always has a magnitude being equal to that of the predetermined voltage $V_z$.

Figure 3:
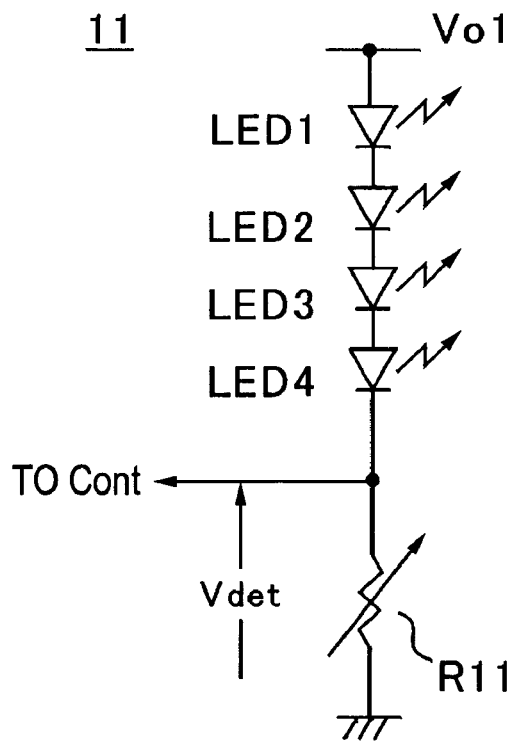
FIG. 3 is a view illustrating the configuration of still another positive output voltage detecting circuit according to a third embodiment of the invention.

FIG. 3 shows a third embodiment of the invention, which is another positive output voltage detecting circuit 11 adapted to be used not only for setting the voltage but also for driving a display device, similarly to the second embodiment shown in FIG. 2.

The embodiment shown in FIG. 3 employs a variable resistor R11 in stead of the constant current source I11. The light emitting diode group is connected in series with the variable resistor R11. The rest of the configuration or the third embodiment is similar to that shown in FIG. 2. The third embodiment can obtain advantages similar to those of the second embodiment.

FIGS. 4A to 4D respectively show the configurations of alternatives of the means for obtaining the predetermined voltage $V_z$ in the negative output voltage setting circuit 20 according to a fourth embodiment of the invention.

Figure 4A:
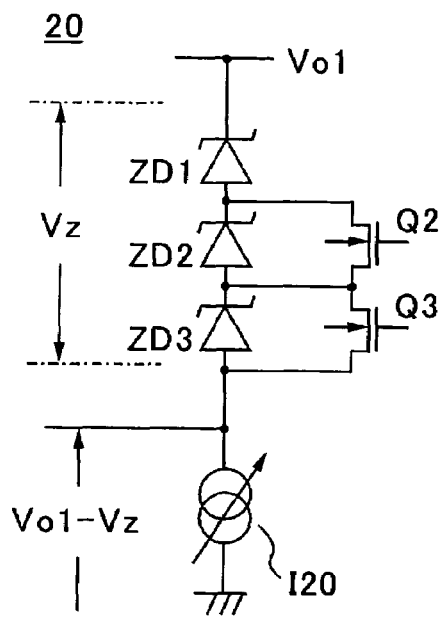
FIGS. 4A to 4D are views illustrating other negative output voltage setting circuits according to a fourth embodiment of the invention.

FIG. 4A shows a means for obtaining the predetermined voltage $V_z$, which is configured so that plural zener diodes ZD1 to ZD3 are series-connected, and that switches Q2 and Q3 are connected in parallel with a given number of the zener diodes (in this case, ZD2 and ZD3). The predetermined voltage $V_z$ can be changed by turning on the switches. Moreover, the predetermined voltage $V_z$ may be changed by preliminarily short-circuiting the zener diodes by using wires in stead of these switches Q2 and Q3, and then cutting these wires at predetermined points.

Figure 4B:
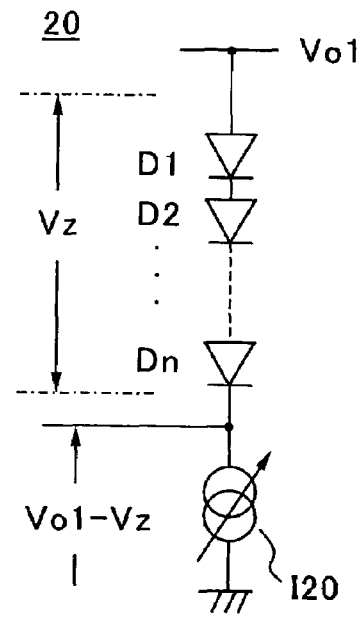
Figure 4C:
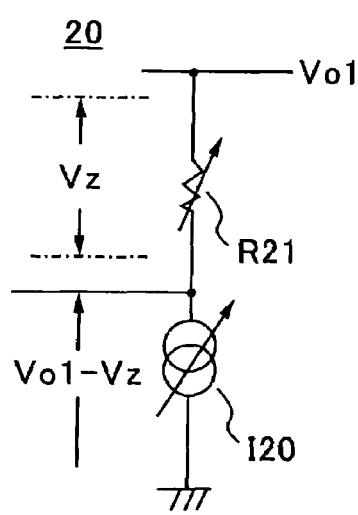
Figure 4D:
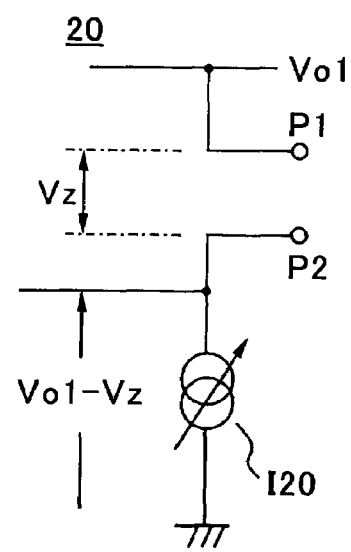

FIG. 4D shows a means for obtaining the predetermined voltage $V_z$, which is configured so that plural diodes D1 to D3 are series-connected to thereby obtain the predetermined voltage $V_z$ according to the number of the series-connected diodes. In this case, similarly, switches may be connected in parallel with a given number of the diodes. The predetermined voltage $V_z$ can be changed by turning on the switches. Moreover, the predetermined voltage $V_z$ may be changed by preliminarily short-circuiting the diodes by using wires in stead of the switches, and then cutting these wires at predetermined points.

FIG. 4C shows a variable resistor R21 provided as a means for obtaining the predetermined voltage $V_z$. The predetermined voltage $V_z$ is obtained according to the value of resistance, which is set in the variable resistor R21. In this case, a given predetermined voltage $V_z$ can be obtained by changing the value of resistance of the variable resistor R21 and the current value of the constant current source 120.

FIG. 4D shows a circuit in which terminals P1 and P2 are provided so that the means for generating the predetermined voltage $V_z$, as illustrated in FIGS. 4A to 4C, which serves as an external device, is connected therebetween. The predetermined voltage $V_z$ can be generated between the terminals P1 and P2 by externally connecting the means for generating the predetermined voltage $V_z$ therebetween.

Figure 5:
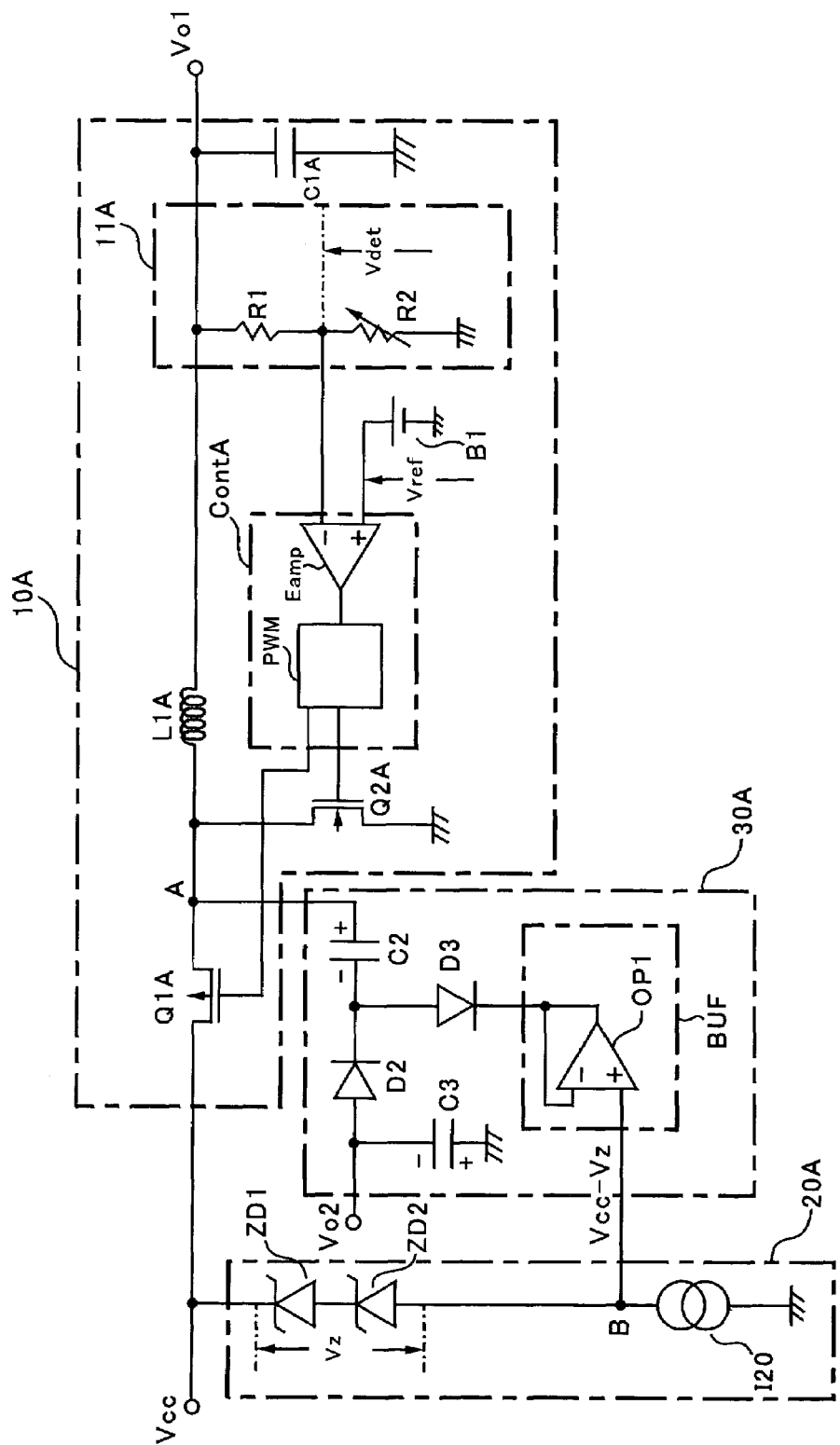
FIG. 5 is a view illustrating the configuration of a power supply for positive and negative output voltages according to a fifth embodiment of the invention.

FIG. 5 is a view illustrating the configuration of a power supply for positive and negative output voltages according to a fifth embodiment of the invention.

As shown in FIG. 5, a switching power supply circuit 10A is a step-down power supply adapted to drop an inputted power supply voltage $v_{cc}$ and to output the dropped positive output voltage $V_{O1}$.

A coil L1A is energized by the input power supply voltage $V_{cc}$ through a first switch Q1A of a P-type MOS transistor. A smoothing capacitor C1A is connected to an output terminal of the coil L1A. The charging voltage of the smoothing capacitor C1A is outputted as a positive output voltage $v_{O1}$. A second switch Q2A of an N-type MOS transistor is connected in parallel with a series circuit including the coil L1A and the smoothing capacitor C1A, and switched so that the first switch Q1A and the second switch Q2A are complementary to each other (that is, the first switch Q1A and the second switch Q2A are turned on and off in such a way as to be put into opposite states).

A positive output voltage detecting circuit 11A has a configuration similar to the positive output voltage detecting circuit 11 shown in FIG. 1. A control circuit ContA outputs complementary switching signals to the first switch Q1A and the second switch Q2A. The rest or the configuration of the control circuit ContA is similar to that of the control circuit Cont shown in FIG. 1.

The positive output voltage $v_{O1}$ is controlled by this switching power supply circuit 10A in such a manner as to be equal to a predetermined voltage $(=V_{ref} \times (R1+R2)/R2)$ obtained by dropping the power supply voltage $V_{cc}$. A voltage at a connection point A between the first switch Q1A and the coil L1A is the power supply voltage $V_{cc}$ or 0 in response to the off or on of the first switch Q1A.

A negative output voltage setting circuit 20A is configured so that a predetermined number of zener diodes ZD1 and ZD2 and a constant current source 120 are series-connected between a power supply voltage point ($V_{cc}$). The zener diodes are used for obtaining a voltage to be obtained by dropping the predetermined voltage $V_z$. Therefore, an appropriate value is selected according to the predetermined voltage $V_z$ as the number of the zener diodes. A negative output voltage setting voltage ($V_{cc}-V_z$), which is lower than the power supply voltage $V_{cc}$ by the predetermined voltage $V_z$, is outputted from a connection point B between the zener diode and the constant current source 120.

A negative output voltage generating circuit 30A has a configuration similar to that of the negative output voltage generating circuit 30 shown in FIG. 1. The positive output voltage detecting circuits shown in FIGS. 2 and 3 can be used as the positive output voltage detecting circuit 11A. The negative output voltage setting circuits shown in FIGS. 4A to 4D can be used as the negative output voltage setting circuit 20A.

The power supply for positive and negative output voltages shown in FIG. 5 has the aforementioned configuration, so that the predetermined positive output voltage $V_{O1}$ obtained by dropping the power supply voltage $V_{cc}$ is outputted from the switching power supply circuit 10A, and that the negative output voltage $V_{O2}$, which is equal to the predetermined voltage $V_z$, is outputted from the negative voltage generating circuit 30A.

According to the invention, first, a predetermined positive output voltage converted from a power supply voltage is generated by using a switching power supply circuit for raising or dropping an input power supply voltage by using a coil. Also, a predetermined negative output voltage is outputted from a negative output voltage generating circuit by using a voltage at connection point, which changes between a high voltage and zero in response to the switching thereof, and a negative output voltage setting voltage, which is set to be lower than the predetermined positive output voltage or the input power supply voltage by a predetermined voltage. The negative output voltage generating circuit can be constituted by the combination of two diodes and two capacitors. Consequently, the positive output voltage and the negative output voltage, which respectively have predetermined values, can be generated by adding a simple circuit to the switching power supply circuit.

Also, according to the invention, a positive output voltage detecting circuit comprises a series circuit of light emitting diodes and a constant current circuit or a resistor. A positive output voltage detecting voltage is outputted from a series connection point thereof. Thus, an appropriate current, which is needed for emitting light, can be supplied to the light emitting diodes. Consequently, the light emitting diodes can, be made to appropriately emit light as light sources. At that time, the positive output voltage may change from a predetermined value due to variation in the voltage of the light emitting diode. Even in this case, the negative output voltage can be generated in such a way as to have a predetermined voltage value.

Also, according to the invention, a negative output voltage setting circuit comprises a series circuit of zener diodes or diodes serving as voltage dropping devices, and a constant current circuit. A negative output voltage setting voltage is outputted from a series connection point. The negative output voltage setting voltage is changed by changing the number of series-connected voltage dropping devices. Thus, a predetermined voltage for determining the magnitude of the negative output voltage can be obtained in such a manner as to have a stable magnitude. When needed, the magnitude thereof can be changed.

Also, the negative output voltage setting circuit is constituted by a series circuit of a resistor serving as a voltage dropping device, and a constant current circuit. The negative output voltage setting voltage is outputted from a series connection portion thereof. The resistance value of the resistor serving as a voltage dropping device, and a constant current value of the constant current circuit can be adjusted. Thus, the predetermined value for determining the magnitude of the negative output voltage is obtained in such a way as to have a stable magnitude. When needed, the magnitude thereof can be adjusted to a given value.

What is claimed is:

1. A power supply for positive and negative output voltages, comprising:
    a switching power supply circuit having:
        a coil;
        a switch, series-connected with said coil, for switching energization of said coil by a voltage supplied from an input power supply to said coil;
        a rectifying and smoothing circuit for rectifying and smoothing a voltage at a series connection point between said coil and said switch and for outputting a resultant voltage as a positive output voltage;
        a positive output voltage detecting circuit for generating a positive output voltage detection voltage from the positive output voltage; and
        a control circuit for performing on-off switching of said switch so that the positive output voltage detection voltage is equal to a reference voltage;
    a negative output voltage setting circuit for generating a negative output voltage setting voltage, which is lower than the positive output voltage by a predetermined voltage; and
    a negative output voltage generating circuit for generating a negative output voltage, whose magnitude corresponds to that of the predetermined voltage, according to the voltage at the series connection point between said coil and said switch and to the negative output voltage setting voltage.

2. The power supply for positive and negative output voltages, according to claim 1, wherein said negative output voltage generating circuit has a series circuit which is connected to said series connection point between said coil and said switch in parallel with said switch, said series circuit being constituted by series-connecting a first capacitor, a first diode, and a second capacitor in an order of description in such a way as to connect one end of said first capacitor to the series connection point, to connect the other end of said first capacitor to a cathode of said first diode, to connect an anode of said first diode to one end of said second capacitor and to connect the other end of said second capacitor to a reference potential, and also has a second diode with an anode connected to a connection point between said first diode and said first capacitor and a cathode connected to an output point from which the negative output voltage setting voltage is outputted, and wherein a charging voltage of said second capacitor is outputted as the negative output voltage.

3. A power supply for positive and negative output voltages, comprising:
    a switching power supply circuit having:
        a coil;
        a smoothing capacitor, connected to an output end of said coil, for smoothing a voltage at said output end and for outputting a smoothed voltage as a positive output voltage;
        a first switch, connected to an input end or said coil, for switching energization of said coil by a voltage supplied from an input power supply to said coil;
        a second switch, connected to a connection point between said coil and said first switch in parallel with a series circuit of said coil and said smoothing capacitor and adapted to be switched complementarily to said first switch;
        a positive output voltage detecting circuit for generating a positive output voltage detection voltage according to the positive output voltage; and
        a control circuit for performing on-off switching of said first switch and said second witch so that the positive output voltage detection voltage is equal to a reference voltage;
    a negative output voltage setting circuit for generating a negative output voltage setting voltage, which is lower than an input voltage of said input power supply by a predetermined voltage; and
    a negative output voltage generating circuit for generating a negative output voltage, whose magnitude corresponds to that of the predetermined voltage, according to a voltage at the connection point between said coil and said first switch and to the negative output voltage setting voltage.

4. The power supply for positive and negative output voltages, according to claim 3, wherein said negative output voltage generating circuit has a series circuit with one end connected to said connection point between said coil and said first switch in parallel with said second switch, said series circuit being constituted by series-connecting a first capacitor, a first diode, and a second capacitor in an order of description in such a way as to connect one end of said first capacitor to said connection point, to the other end of said first, capacitor to a cathode of said first diode and to connect an anode of said first diode to one end of said second capacitor, also has a second diode with an anode connected to a connection point between said first diode and said first capacitor and a cathode connected to an output point from which the negative output voltage setting voltage is outputted, and wherein a charging voltage of said second capacitor is outputted as the negative output voltage.

5. The power supply for positive and negative output voltages, according to claim 1, wherein said positive output voltage detecting circuit comprises a series circuit including at least one light emitting diode and a constant current circuit, and wherein the positive output voltage detecting voltage is outputted from a series connection point of said at least one light emitting diode and said constant current circuit.

6. The power supply for positive and negative output voltages, according to claim 1, wherein said positive output voltage detecting circuit comprises a series circuit including at least one light emitting diode and a resistor, and wherein the positive output voltage detecting voltage is outputted from a series connection point of said at least one light emitting diode and said resistor.

7. The power supply for positive and negative output voltages, according to claim 1, wherein said positive output voltage detecting circuit comprises a resistance potential dividing circuit, and wherein the positive output voltage detecting voltage is outputted from a potential dividing point of said resistance potential dividing circuit.

8. The power supply for positive and negative output voltages, according to claim 1, wherein said negative output voltage setting circuit comprises a series circuit including at least one zener diode serving as a voltage dropping device and a constant current circuit, and wherein the negative output voltage setting voltage is outputted from a series connection point of said at least one zener diode and said constant current circuit.

9. The power supply for positive and negative output voltages, according to claim 1, wherein said negative output voltage setting circuit comprises a series circuit including at least one diode serving as a voltage dropping device and a constant current circuit, and wherein the negative output voltage setting voltage is outputted from a series connection point or said at least one diode and said constant current circuit.

10. The power supply for positive and negative output voltages, according to claim 8, wherein the negative output voltage setting voltage can be changed by changing the number of series-connected voltage dropping devices of said negative output voltage setting circuit.

11. The power supply for positive and negative output voltages, according to claim 9, wherein the negative output voltage setting voltage can be changed by changing the number of series-connected voltage dropping devices of said negative output voltage setting circuit.

12. The power supply for positive and negative output voltages, according to claim 1 wherein said negative output voltage setting circuit comprises a series circuit including a resistor serving as a voltage dropping device and a constant current circuit, and wherein the negative output voltage setting voltage is outputted from a series connection point of said resistor and said constant current circuit.

13. The power supply for positive and negative output voltages, according to claim 3, wherein said positive output voltage detecting circuit comprises a series circuit including at least one light emitting diode and a constant current circuit, and wherein the positive output voltage detecting voltage is outputted from a series connection point of said at least one light emitting diode and said constant current circuit.

14. The power supply for positive and negative output voltages, according to claim 3, wherein said positive output voltage detecting circuit comprises a series circuit including at least one light emitting diode and a resistor, and wherein the positive output voltage detecting voltage is outputted from a series connection point of said at least one light emitting diode and said resistor.

15. The power supply for positive and negative output voltages, according to claim 3, wherein said positive output voltage detecting circuit comprises a resistance potential dividing circuit, and wherein the positive output voltage detecting voltage is outputted from a potential dividing point of said resistance potential dividing circuit.

16. The power supply for positive and negative output voltages, according to claim 3, wherein said negative output voltage setting circuit comprises a series circuit including at least one zener diode serving as a voltage dropping device and a constant current circuit, and wherein the negative output voltage setting voltage is outputted from a series connection point of said at least one zener diode and said constant current circuit.

17. The power supply for positive and negative output voltages, according to claim 3, wherein said negative output voltage setting circuit comprises a series circuit including at least one diode serving as a voltage dropping device and a constant current circuit, and wherein the negative output voltage setting voltage is outputted from a series connection point of said at least one diode and said constant current circuit.

18. The power supply for positive and negative output voltages, according to claim 16, wherein the negative output voltage setting voltage can be changed by changing the number of series-connected voltage dropping devices of said negative output voltage setting circuit.

19. The power supply for positive and negative output voltages, according to claim 17, wherein the negative output voltage setting voltage can be changed by changing the number of series-connected voltage dropping devices of said negative output voltage setting circuit.

20. The power supply for positive and negative output voltages, according to claim 3, wherein said negative output voltage setting circuit comprises a series circuit including a resistor serving as a voltage dropping device and a constant current circuit, and wherein the negative output voltage setting voltage is outputted from a series connection point of said resistor and said constant current circuit.

\* \* \* \* \*